United States Patent
Nishizawa et al.

(10) Patent No.: US 8,611,061 B2
(45) Date of Patent: Dec. 17, 2013

(54) TRANSMITTER/RECEIVER CIRCUIT FOR PROTECTION CIRCUIT

(75) Inventors: Akihiro Nishizawa, Tokyo (JP); Takashi Takeda, Tokyo (JP)

(73) Assignee: Mitsumi Electric Co., Ltd., Tokyo (JP)

(*) Notice: Subject to any disclaimer, the term of this patent is extended or adjusted under 35 U.S.C. 154(b) by 160 days.

(21) Appl. No.: 13/230,890

(22) Filed: Sep. 13, 2011

(65) Prior Publication Data
US 2012/0236453 A1 Sep. 20, 2012

(30) Foreign Application Priority Data
Sep. 15, 2010 (JP) ................................. 2010-207212

(51) Int. Cl.
*H02H 3/24* (2006.01)

(52) U.S. Cl.
USPC .............................................. 361/86; 361/90

(58) Field of Classification Search
USPC .......................................................... 361/86
See application file for complete search history.

(56) References Cited

U.S. PATENT DOCUMENTS

2005/0253458 A1* 11/2005 Omae et al. .................. 307/10.1
2009/0009133 A1* 1/2009 Tange et al. .................... 320/132

FOREIGN PATENT DOCUMENTS

JP 2005-033951 2/2005
JP 2005-117780 4/2005

* cited by examiner

*Primary Examiner* — Jared Fureman
*Assistant Examiner* — Kevin J Comber
(74) *Attorney, Agent, or Firm* — IPUSA, PLLC (57) ABSTRACT

A transmitter/receiver circuit includes secondary batteries connected in series, a first protection circuit in a high voltage side of the secondary batteries and including a transmitter circuit increasing a voltage of a binary signal to a level that is a first voltage higher than an anode voltage of a first secondary battery connected to the first protection circuit, and a second protection circuit in a low voltage side of the secondary batteries and including a receiver circuit that receives the binary signal from the transmitter circuit via a wiring and including a shift part decreasing the voltage of the binary signal to a level that is a second voltage lower than a cathode voltage of a second secondary battery connected to the second protection circuit, and a detection part that determines that the wiring is disconnected when the voltage of the binary signal is lower than a reference voltage.

9 Claims, 4 Drawing Sheets

TRANSMITTER/RECEIVER CIRCUIT FOR PROTECTION CIRCUIT

BACKGROUND OF THE INVENTION

1. Field of the Invention

The present invention generally relates to a transmitter/receiver circuit for a protection circuit, for example, a transmitter/receiver circuit for a protection circuit that performs over-current protection of a secondary battery.

2. Description of the Related Art

Recent portable devices (e.g., digital cameras) have a lithium ion battery mounted thereon as a secondary battery. Because the lithium ion battery is susceptible to overcharge and over-discharge, a protection circuit for protection from overcharge and a protection circuit for protection from over-discharge are to be provided in the lithium ion battery.

In a case where plural lithium ion batteries are connected in series and used as a single battery pack, the plural lithium ion batteries are monitored by corresponding protection circuits. Because the electrical strength (withstand voltage) of electronic components used in each protection circuit becomes the voltage of a single lithium ion battery, there is no need to use an expensive electronic component (e.g., MOS transistor having high electrical strength) for the protection circuit. Accordingly, inexpensive electronic components are used in the protection circuit.

Figure 4:
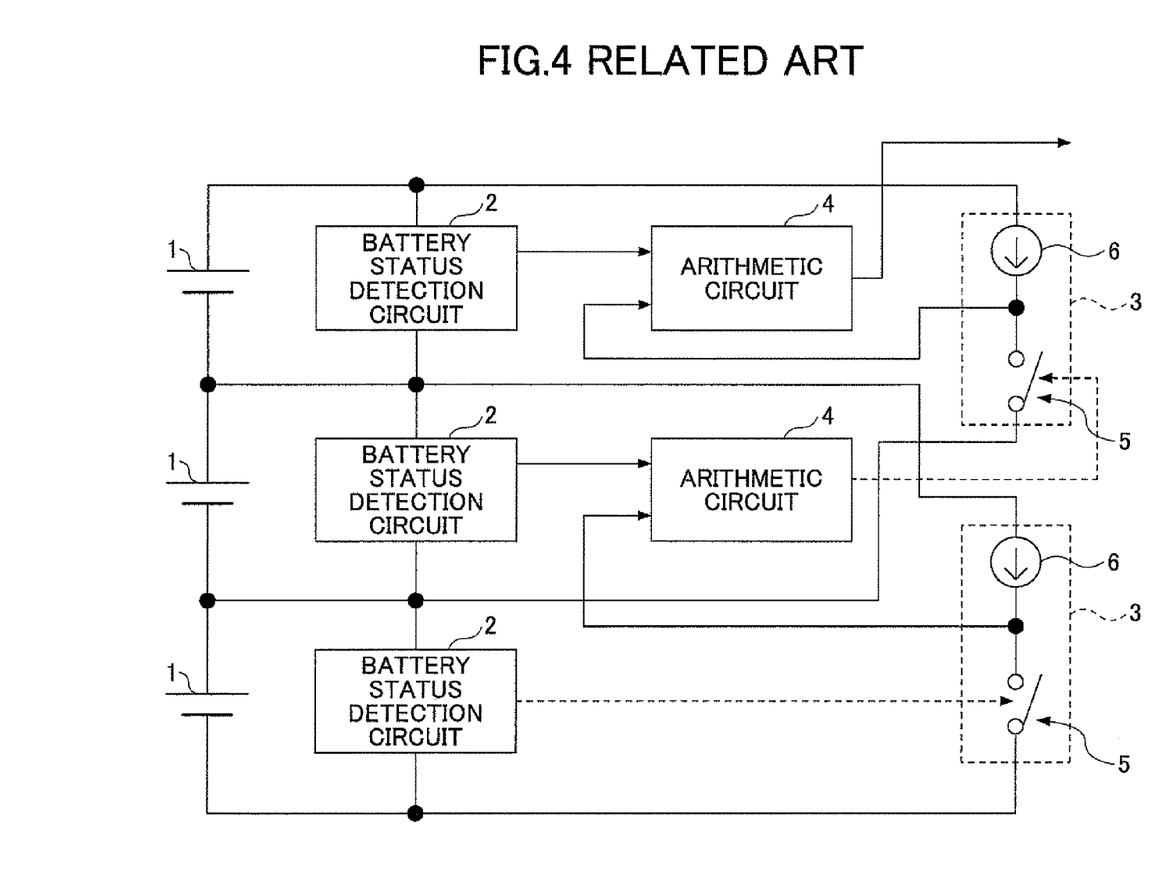
FIG. 4 is a schematic diagram illustrating a configuration of a protection circuit according to a related art example.

As illustrated in FIG. 4, a protection circuit according to a related art example includes serially connected secondary batteries 1, battery status detection circuits 2, level shift circuits 3, and arithmetic circuits 4. The battery status detection circuits 2 are for detecting the status of corresponding second batteries 1 and outputting signals indicating whether the status of the corresponding secondary batteries 1 are normal or abnormal. The level shift circuits 3 are for level-shifting the signals output from the battery status detection circuits 2. The arithmetic circuits 4 are for calculating the level-shifted signals output from the level shift circuits 3. Each of the level shift circuits 3 includes a constant current circuit 6 and a switch 5. The level shift circuit 3 converts the signals output from the battery status detection circuit 2 to a size of a current and outputs a signal indicative of the size of the current. The arithmetic circuit 4 performs an OR operation between the signal output from the level shift circuit 3 and the signal output from the battery status detection circuit 2 (see, for example, Japanese Laid-Open Patent Publication No. 2005-33951).

A protection circuit according to another related art example is capable of cascade connection and includes plural serially connected batteries provided inside a block, detection circuits for monitoring voltages of each battery, output terminals A for outputting signals from the detection circuits to the outside, connection terminals B for connecting to another protection circuit having the same function as the protection circuit, and an output circuit for connecting the output terminal A and the connection terminal B. The output circuit has a function of changing an electric status between the output terminal A and the connection terminal B in accordance with an output from the detection circuits. The output circuit also has a function of transmitting a signal input from the other protection circuit to the output terminal A (see, for example, Japanese Laid-Open Patent Publication No. 2005-117780).

With the protection circuit of FIG. 4, a disconnection of a signal line between the level shift circuits 3 and the arithmetic circuits 4 cannot be detected. Depending on the design of the arithmetic circuit 4, it is possible for the arithmetic circuit 4 to achieve a fail-safe configuration by outputting signals from the arithmetic circuit 4 in the same manner as the case where the battery circuit detection circuit detects an abnormal status. However, this fail-safe configuration reduces the degree of freedom for the battery status detection circuits 2 and the logical configuration of the arithmetic circuit 4.

SUMMARY OF THE INVENTION

The present invention provides a transmitter/receiver circuit for a protection circuit that substantially eliminates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a transmitter/receiver circuit for a protection circuit particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a transmitter/receiver circuit including: plural secondary batteries connected in series; a first protection circuit provided in a high voltage side of the plural secondary batteries and including a transmitter circuit configured to increase a voltage of a binary signal to a level that is a first voltage higher than an anode voltage of a first secondary battery connected to the first protection circuit; and a second protection circuit provided in a low voltage side of the plural secondary batteries and including a receiver circuit configured to receive the binary signal transmitted from the transmitter circuit via a wiring and including a shift part configured to decrease the voltage of the binary signal to a level that is a second voltage lower than a cathode voltage of a second secondary battery connected to the second protection circuit, and a detection part configured to determine that the wiring is disconnected when the voltage of the binary signal is lower than a reference voltage.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Circuit Configuration of First Embodiment

Figure 1:
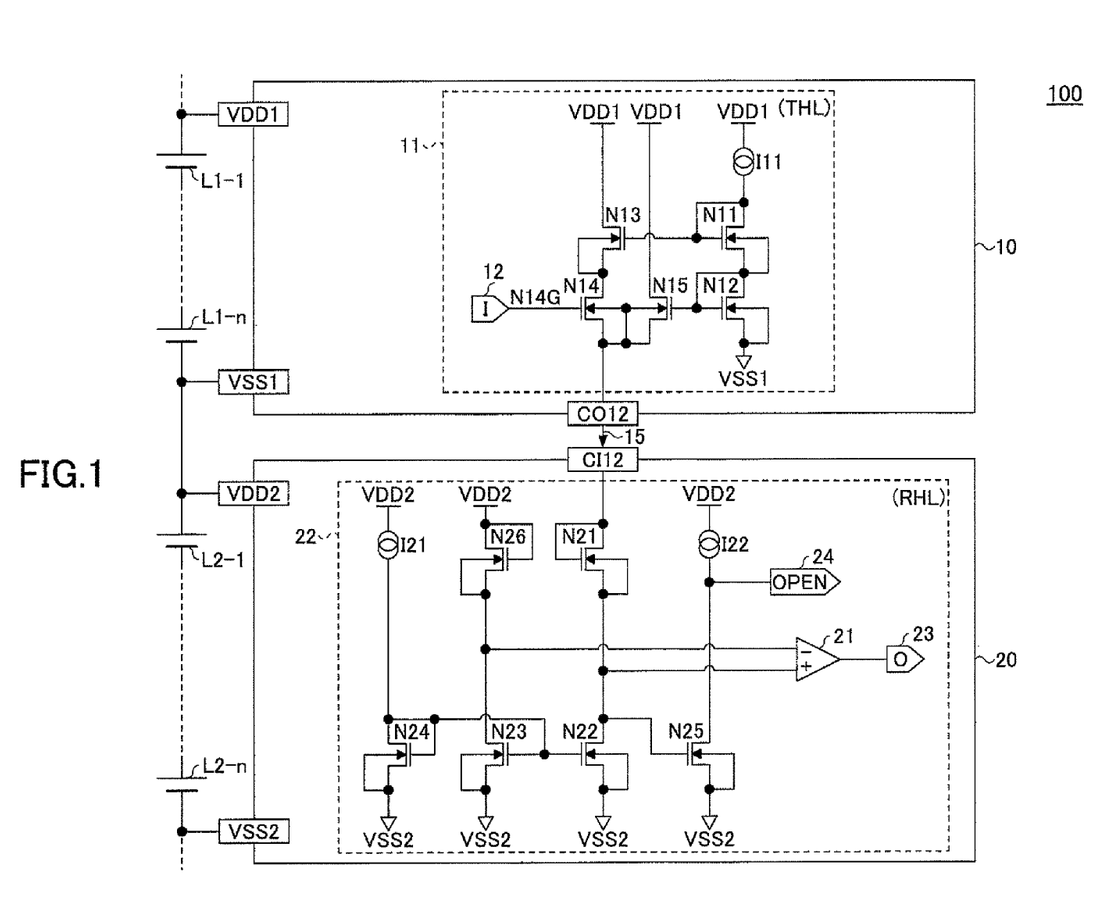
FIG. 1 is a schematic diagram illustrating a configuration of a transmitter/receiver circuit for a protection circuit according to a first embodiment of the present invention.

FIG. 1 is a schematic diagram illustrating a configuration of a transmitter/receiver circuit 100 for a protection circuit according to a first embodiment of the present invention. The transmitter/receiver circuit 100 includes plural secondary batteries (in this embodiment, plural lithium ion batteries) L1-1 to L2-$n$ that are connected in series. In FIG. 1, at least one of an overcharge detection signal, an over-discharge detection signal, an over-current detection signal, and an OR operation signal of a disconnection signal is transmitted from a high voltage side protection circuit (i.e. a protection circuit provided on a high voltage side of the plural lithium ion batteries L1-L2-$n$) 10 to a low voltage side protection circuit (i.e. a protection circuit provided on a low voltage side of the plural lithium ion batteries L1-L2-$n$) 20. A power supply terminal (hereinafter also referred to as "power supply") VDD1 is connected to one end of plural serially connected lithium ion batteries L1-1 to L1-$n$ of the protection circuit 10 and a power supply terminal (hereinafter also referred to as "power supply") VSS1 is connected to the other end of the plural serially connected lithium ion batteries L1-1 to L1-$n$ of the protection circuit 10. Further, a power supply terminal (hereinafter also referred to as "power supply") VDD2 is connected to one end of plural serially connected lithium ion batteries L2-1 to L2-$n$ of the protection circuit 20 and a power supply terminal (hereinafter also referred to as "power supply") VSS2 is connected to the other end of the plural serially connected lithium ion batteries L2-1 to L2-$n$ of the protection circuit 20. Because the anode (negative electrode) of the lithium ion battery L1-$n$ is connected to the cathode (positive electrode) of the lithium ion battery L2-1, the power supply VSS1 of the protection circuit 10 is substantially equal to the power supply VDD2 of the protection circuit 20. In this embodiment, the protection circuits 10 and 20 of the transmitter/receiver circuit 100 are connected by cascade connection.

The protection circuit 10 includes a transmitter circuit (signal transmitter circuit) 11 of a high voltage transmission side (THL). The signal transmitter circuit 11 includes n-channel MOS transistors N11 to N15 and a constant current circuit I11. The drain and gate of the MOS transistor N11 are connected to the power supply VDD1 via the constant current circuit I11. The source and back gate of the MOS transistor N11 are connected to the drain and gate of the MOS transistor N12. The source and back gate of the MOS transistor N12 are connected to the power supply VSS1. Common connection is established between the gate of the MOS transistor N11 and the gate of the MOS transistor N13. Common connection is also established between the gate of the MOS transistor N12 and the gate of the MOS transistor N15.

The drain of the MOS transistor N13 is connected to the power supply VDD1. The source and back gate of the MOS transistor N13 are connected to the drain of the MOS transistor N14. Common connection is established between the source and the back gate of the MOS transistor N14 and the source and the back gate of the MOS transistor N15. Further, the source and the back gate of the MOS transistor N14 is connected to an output terminal CO12 of the protection circuit 10. The gate of the MOS transistor N14 is connected to a terminal 12. The drain of the MOS transistor N15 is connected to the power supply VDD1.

At least one of the overcharge detection signal, the over-discharge detection signal, the over-current detection signal, and the OR operation signal of the disconnection signal, which is generated in the protection circuit 10, is supplied to the terminal 12. The signal supplied to the terminal 12 is a binary signal indicating a high level (value 1) or a low level (value 0). The threshold voltage of each of the n-channel MOS transistors N11 to N15 is indicated as VTHn1.

In a case where the signal supplied to the terminal 12 is a high level signal (voltage VSS1+V $\alpha$:V$\alpha$>VTHn1), the threshold voltages of the MOS transistors N11 and N12 are added to the voltage of the power supply VSS1. Then, the threshold voltage of the MOS transistor N13 is subtracted from the added voltage (VSS1+VTHn1). Then, a signal of the subtracted voltage is output as a high level (value 1) from the output terminal CO12. The VTHn1 corresponds to a first voltage.

In a case where the signal supplied from the terminal 12 is a low level signal (voltage VSS1), the threshold voltage of the MOS transistor N12 is added to the voltage VSS1, and then, the threshold voltage of the MOS transistor N15 is subtracted. Thereby, an output terminal C012 of the protection circuit 10 outputs a voltage of VSS1 as a low level signal (value 0). The output terminal CO12 is connected to the input terminal CI12 via a signal wiring 15.

The protection circuit 20 includes a receiver circuit (signal receiver circuit) 22 of a low voltage transmission side (RHL). The signal receiver circuit 22 includes n-channel MOS transistors N21 to N26, constant current circuits 121, 122, and a comparator 21. The drain and gate of the MOS transistor N21 are connected to the input terminal C112. The source and back gate of the MOS transistor N21 are connected to the drain of the MOS transistor N22, the gate of the MOS transistor N25, and a non-inverting input terminal of the comparator 21. The source and back gate of the MOS transistor N22 are connected to the power supply VSS2.

The gate of the MOS transistor N22 establishes common connection with the gate of the MOS transistor N23 and the gate and drain of the MOS transistor N24. The source and back gate of each of the MOS transistors N22, N23, N24 are connected to the power supply VSS2. The MOS transistors N22, N23, and N24 constitute a current mirror circuit. The drain of the MOS transistor N23 is connected to the source and back gate of the MOS transistor N26 and an inverting input terminal of the comparator 21. The drain and gate of the MOS transistor N26 is connected to the power supply VDD2. The gate and drain of the MOS transistor N24 is connected to the power supply VDD2 via the constant current circuit 121.

The source and back gate of the MOS transistor N25 is connected to the power supply VSS2. The drain of the MOS transistor N25 is connected to a terminal 24. The drain of the MOS transistor N25 is also connected to the power supply VDD2 via the constant current circuit 122.

In this embodiment, except for the MOS transistor N26, the threshold voltage of each of the n-channel MOS transistors of the signal transmitter receiver circuit 22 is VTHn2 (=VTHn1). The MOS transistor N26 is formed having a device size smaller larger than the device size of the MOS transistor N21. Thus, the MOS transistor N26 has a threshold voltage of VTHn2L which is smaller than the threshold voltage VTHn2 of the MOS transistor N21 (VTHn2L≤VTHn2).

The threshold voltage of the MOS transistor N26 is subtracted from the voltage of the power supply VDD2 (=VDD2−VTHn2L). Then, the source of the MOS transistor N26 supplies the subtracted voltage to the inverting input terminal of the comparator 21 as a reference voltage.

In a case where a signal supplied from the input terminal CI12 of the protection circuit 20 is a high level signal (value 1), that is, a case where the voltage of the signal supplied from the input terminal CI12 is (VSS1+VTHn1−VDD2+VTHn1), the source of the MOS transistor N21 supplies a voltage of VDD2+VTHn1−VTHn2 (i.e. a voltage obtained by subtracting the threshold voltage of the MOS transistor N21 from the voltage of the input terminal CI12 (=VDD2+VTHn1)) to the non-inverting input terminal of the comparator 21. Accordingly, the comparator 21 outputs a high level signal (value 1) via a terminal 23.

In a case where a signal supplied from the input terminal CI12 of the protection circuit 20 is a low level signal (value 0), that is, a case where the voltage of the signal supplied from the input terminal CI12 is (VSS1=VDD2), the source of the MOS transistor N21 supplies a voltage of VDD2 VTHn2 (i.e. a voltage obtained by subtracting the threshold voltage of the MOS transistor N21 from the voltage of the input terminal CI12 (=VDD2)) to the non-inverting input terminal of the comparator 21. Accordingly, the comparator 21 outputs a low level signal (value 0) from the terminal 23. The VTHn2 corresponds to a second voltage.

In a case where the signal wiring 15 is disconnected, the drain of the MOS transistor N22 becomes a low level, and the MOS transistor N25 is turned off. Accordingly, a disconnection detection signal (which is to be a high level) is output from the terminal 24 connected to the drain of the MOS transistor N25. In a case where the signal wiring 15 is not disconnected, the MOS transistor N25 is turned on. Accordingly, a low level signal is output from the terminal 24 connected to the drain of the MOS transistor N25.

It is to be noted that regardless of whether the signal supplied to the terminal 12 is a high level or a low level, the voltage of the input terminal CI12 of the protection circuit 20 is pulled down to the voltage of the power supply VSS2 in accordance with a current value set by the constant current circuit I21. The range of the operating voltage of the terminal CI12 is determined in accordance with a bias voltage set in the constant current circuit I11, the MOS transistors N11, N12, a source follower of the n-channel MOS transistors N13, N15, and the gate status of the MOS transistor N14 (high level/low level).

As described above with reference to FIG. 1, the n-channel MOS transistors N21-N24, N26 and the constant current circuit I21 according to the first embodiment may serve as a shift part (voltage shift part) of the signal receiver circuit 22 for decreasing the voltage of the binary signal from the transmitter circuit 11 to a level that is a second voltage lower than a cathode voltage of a second secondary battery connected to the second protection circuit 20. Further, the n-channel MOS transistor N25 and the constant current circuit I22 may serve as a detection part for determining that the wiring 15 is disconnected when the voltage of the binary signal is lower than a reference voltage. Further, the comparator 21 may serve as a comparator part for comparing the voltage of the binary signal with the reference voltage.

Circuit Configuration of Second Embodiment

Figure 2:
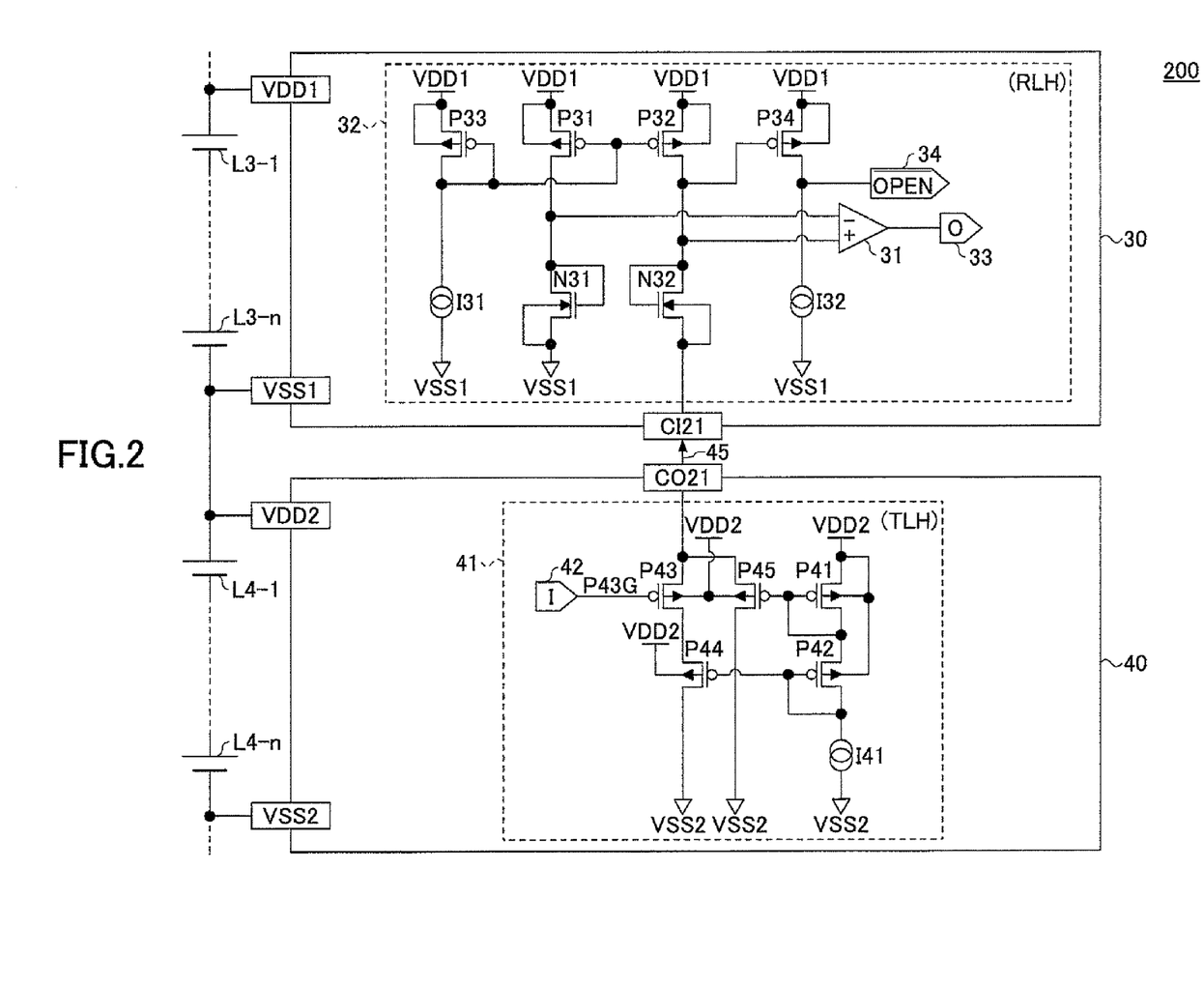
FIG. 2 is a schematic diagram illustrating a configuration of a transmitter/receiver circuit for a protection circuit according to a second embodiment of the present invention.

FIG. 2 is a schematic diagram illustrating a configuration of a transmitter/receiver circuit 200 for a protection circuit according to a second embodiment of the present invention. The transmitter/receiver circuit 200 includes plural secondary batteries (in this embodiment, plural lithium ion batteries) L3-1 to L4-$n$ that are connected in series. In FIG. 2, at least one of an overcharge detection signal, an over-discharge detection signal, an over-current detection signal, and an OR operation signal of a disconnection signal is transmitted from a low voltage side protection circuit (i.e. a protection circuit provided on a low voltage side of the plural lithium ion batteries L3-1 to L4-$n$) 40 to a high voltage side protection circuit (i.e. a protection circuit provided on a high voltage side of the plural lithium ion batteries L3-1 to L4-$n$) 30. A power supply terminal (hereinafter also referred to as "power supply") VDD2 is connected to one end of plural serially connected lithium ion batteries L4-1 to L4-$n$ of the protection circuit 40 and a power supply terminal (hereinafter also referred to as "power supply") VSS2 is connected to the other end of the plural serially connected lithium ion batteries L4-1 to L4-$n$ of the protection circuit 40. Further, a power supply terminal (hereinafter also referred to as "power supply") VDD1 is connected to one end of plural serially connected lithium ion batteries L3-1 to L3-$n$ of the protection circuit 30 and a power supply terminal (hereinafter also referred to as "power supply") VSS1 is connected to the other end of the plural serially connected lithium ion batteries L3-1 to L3-$n$ of the protection circuit 30. Because the anode (negative electrode) of the lithium ion battery L3-$n$ is connected to the cathode (positive electrode) of the lithium ion battery L4-1, the power supply VSS1 of the protection circuit 30 is substantially equal to the power supply VDD2 of the protection circuit 40. In this embodiment, the protection circuits 30 and 40 of the transmitter/receiver circuit 200 are connected by cascade connection.

The protection circuit 40 includes a transmitter (signal transmitter circuit) 41 of a low voltage transmission side (TLH). The signal transmitter circuit 41 includes p-channel MOS transistors P41 to P45 and a constant current circuit 141. The source and back gate of the MOS transistor P41 are connected to the power supply VDD2. The drain and gate of the MOS transistor P41 are connected to the source of the MOS transistor P42. The back gate of the MOS transistor P42 is connected to the power supply VDD2. The drain and gate of the MOS transistor P42 are connected to the power supply VSS2 via the constant current circuit I41. Common connection is established between the gate of the MOS transistor P41 and the gate of the MOS transistor P45. Common connection is also established between the gate of the MOS transistor P42 and the gate of the MOS transistor P44.

The source of the MOS transistor P43 and the source of the MOS transistor P45 are connected to an output terminal CO21 of the protection circuit 40. The back gate of the MOS transistor P43 and the back gate of the MOS transistor P45 are connected to the power supply VDD2. The drain of the MOS transistor P45 is connected to the power supply VSS2. The gate of the MOS transistor P43 is connected to a terminal 42. The drain of the MOS transistor P43 is connected to the source of the MOS transistor P44. The back gate of the MOS transistor P44 is connected to the power supply VDD2. The drain of the MOS transistor P44 is connected to the power supply VSS2.

At least one of the overcharge detection signal, the over-discharge detection signal, the over-current detection signal, and the OR operation signal of the disconnection signal, which is generated in the protection circuit 40, is supplied to the terminal 42. The signal supplied to the terminal 42 is a binary signal indicating a high level (value 1) or a low level (value 0). The threshold voltage of each of the p-channel MOS transistors P41 to P45 is indicated as VTHp4.

In a case where the signal supplied via the terminal 42 is a high level (voltage VDD2), an absolute value of a threshold voltage of the MOS transistor P41 (|VTHp4|) is subtracted from the voltage of the power supply VDD2. Then, an absolute value of a threshold voltage of the MOS transistor P45 (|VTHp4|) is added to the subtracted voltage (=VDD2). Then, a signal of the added voltage is output as a high level (value 1) from the output terminal CO21. The VTHp4 corresponds to a first voltage.

In a case where the signal supplied via the terminal 42 is a low level (voltage VDD2−Vβ: VDD2−|VTHp4|>Vβ), the threshold voltage of the MOS transistor P41 and the threshold voltage of the MOS transistor P42 are subtracted from the voltage of the power supply VDD2 and then, added with the threshold voltage of the MOS transistor P44. Thereby, an output terminal CO21 of the protection circuit 40 outputs a voltage of (VDD2−|VTHp4|) as a low level signal (value 0). The output terminal CO21 is connected to the input terminal CI21 via a signal wiring 45.

The protection circuit 30 includes a receiver circuit (signal receiver circuit) 32 of a high voltage transmission side (RLH). The receiver circuit 32 includes p-channel MOS transistors P31 to P34, n-channel MOS transistors N31, N32, constant current circuits I31, I32, and a comparator 31. The source and back gate of the MOS transistor N32 are connected to the input terminal CI21. The drain and gate of the MOS transistor N32 are connected to the drain of the MOS transistor P32, the gate of the MOS transistor P34, and a non-inverting input terminal of the comparator 31. The source and back gate of the MOS transistor P32 are connected to the power supply VDD1.

The gate of the MOS transistor P32 establishes common connection with the gate of the MOS transistor P31 and the gate and drain of the MOS transistor P33. The source and back gate of each of the MOS transistors P31, P32, P33 are connected to the power supply VDD1. The MOS transistors P31, P32, and P33 constitute a current mirror circuit. The drain of the MOS transistor P32 is connected to the drain and the gate of the MOS transistor N32 and a non-inverting input terminal of the comparator 31. The source and back gate of the MOS transistor N31 are connected to the power supply VSS1. The gate and drain of the MOS transistor P33 are connected to the power supply VSS1 via the constant current circuit I31.

The source and the back gate of the MOS transistor P34 are connected to the power supply VDD1. The drain of the MOS transistor P34 is connected to a terminal 34. The drain of the MOS transistor P34 is also connected to the power supply VSS1 via the constant current circuit I32.

In this embodiment, except for the MOS transistor N31, the threshold voltage of each of the n-channel MOS transistors of the signal receiver circuit 32 is VTHn3. The MOS transistor N31 is fanned having a device size larger than the device size of the MOS transistor N32. Thus, the MOS transistor N31 has a threshold voltage of VTHn3L which is smaller than the threshold voltage VTHn3 of the MOS transistor N32 (VTHn3L≤VTHn3).

The threshold voltage of the MOS transistor N31 is added to the voltage of the power supply VSS1 (=VSS1 VTHn3L). Then, the drain of the MOS transistor N31 supplies the added voltage to the inverting input terminal of the comparator 31 as a reference voltage.

In a case where the signal supplied to the input terminal CI21 is a high level signal (value 1), that is, in a case where the voltage of the signal supplied to the input terminal CI21 is (VDD2=VSS1), the drain of the MOS transistor N32 supplies a voltage of VSS1 VTHn3 (i.e. a voltage obtained by adding the threshold voltage of the MOS transistor N32 to the voltage of the input terminal CI21 (=VSS1) to the non-inverting input terminal of the comparator 31. Accordingly, the comparator 31 outputs a high level signal (value 1) from a terminal 33.

In a case where the signal supplied to the input terminal CI21 is a low level signal (value 0), that is, in a case where the voltage of the signal supplied to the input terminal CI21 is (VDD2−|VTHp4|=VSS1−|VTHp4|), the drain of the MOS transistor N32 supplies a voltage of VSS1−|VTHp4|+VTHn3 (i.e. a voltage obtained by adding the threshold voltage of the MOS transistor N32 to the voltage of the input terminal CI21 (=VSS1−|VTHp4|) to the non-inverting input terminal of the comparator 31. Accordingly, the comparator 31 outputs a low level signal (value 0) via the terminal 33. The VTHn3 corresponds to a second voltage.

In a case where the signal wiring 45 is disconnected, the drain of the MOS transistor N32 becomes a high level, and the MOS transistor 234 is turned off. Accordingly, a disconnection detection signal (which is to be a low level) is output from the terminal 34 connected to the drain of the MOS transistor 234. In a case where the signal wiring 45 is not disconnected, the MOS transistor P34 is turned on. Accordingly, a high level signal is output from the terminal 34 connected to the drain of the MOS transistor P34.

It is to be noted that regardless of whether the signal supplied to the terminal 42 is a high level or a low level, the voltage of the input terminal CI21 of the protection circuit 30 is pulled up to the voltage of the power supply VDD1 in accordance with the constant current circuit 131. The range of the operating voltage of the terminal CI21 is determined in accordance with the constant current circuit 141, the p-channel MOS transistors P41, P42, 244, P45, and the gate status of the p-channel MOS transistor P43 (high level/low level).

As described above with reference to FIG. 2, the MOS transistors P31-233, N31, N32 and the constant current circuit 131 according to the second embodiment may serve as a shift part (voltage shift part) of the signal transmitter circuit 41 for increasing the voltage of the binary signal to a level that is a second voltage higher than an anode voltage of a second secondary battery connected to the second protection circuit 30. Further, the p-channel MOS transistor P34 and the constant current circuit I32 may serve as a detection part for determining that the wiring 45 is disconnected when the voltage of the binary signal is lower than a reference voltage. Further, the comparator 31 may serve as a comparator part for comparing the voltage of the binary signal with the reference voltage.

[Configuration of Multilevel Protection Circuits]

Figure 3:
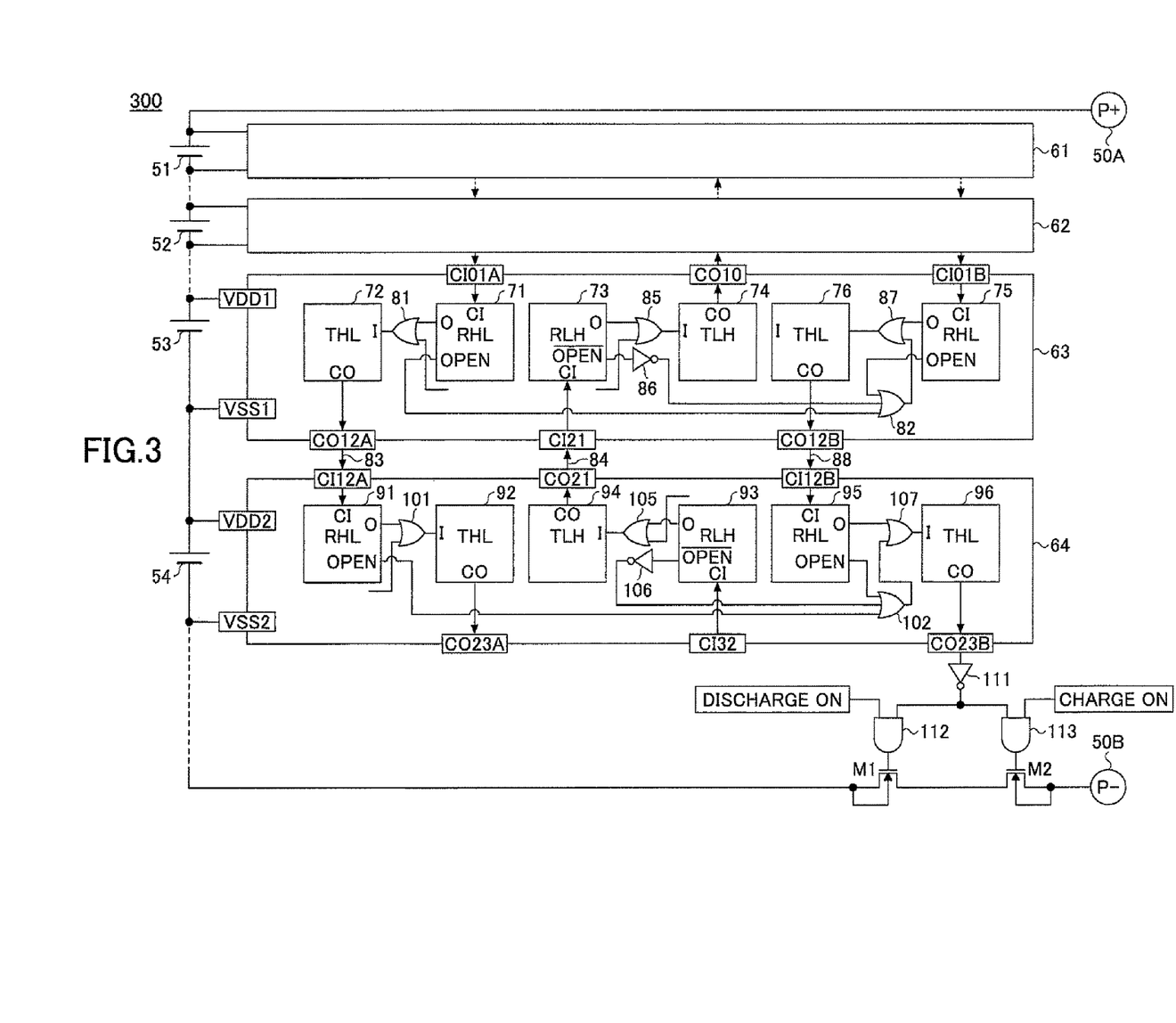
FIG. 3 is a schematic diagram illustrating a configuration including a transmitter/receiver circuit including plural levels of protection circuits according to an embodiment of the present invention.

FIG. 3 is a schematic diagram illustrating a configuration including a transmitter/receiver circuit 300 including plural levels of protection circuits 61-64 according to an embodiment of the present invention. In FIG. 3, plural lithium ion batteries 51 to 54 are connected in series. The anode of the lithium ion battery 51 is connected to an output terminal 50A. The cathode of the lithium ion battery 51 is connected to an output terminal 50B via first and second MOS transistors M1, M2. The first MOS transistor M1 is for controlling the discharging of the lithium ion batteries 51-54. The second MOS transistor M2 is for controlling charging of the lithium ion batteries 51-54. It is to be noted that a load (not illustrated) is connected between the output terminal 50A and the output terminal 50B.

A power supply VDD of one of the protection circuits 61-64 is connected to one end of a corresponding one of the lithium ion batteries 51-54 and a power supply VSS of the one of the protection circuits 61-64 is connected to the other end of the corresponding one of the lithium ion batteries 51-54. It is, however, to be noted that only the power supplies of the protection circuits 63 and 64 are illustrated in FIG. 3. That is, the power supplies (power supply terminals) of the protection circuit 64 are indicated as VDD1 and VSS1 in FIG. 3, and the power supplies (power supply terminals) of the protection circuit 63 are indicated as VDD2 and VSS2 in FIG. 3. The protection circuits 61-64 are connected by cascade connection.

The protection circuit 63 includes a signal receiver circuit (RHL) 71 for receiving signals from a high voltage side to a low voltage side of the plural lithium ion batteries 51 to 54, a signal transmitter circuit (THL) 72 for transmitting signals from a high voltage side to a low voltage side of the plural lithium ion batteries 51 to 54, a signal receiver circuit (RLH) 73 for receiving signals from a low voltage side to a high voltage side of the plural lithium ion batteries 51 to 54, a signal transmitter circuit (TLH) 74 for transmitting signals from a low voltage side to a high voltage side of the plural lithium ion batteries 51 to 54, a signal receiver circuit (RHL) 75 for receiving signals from a high voltage side to a low voltage side of the plural lithium ion batteries 51 to 54, a signal transmitter circuit (THL) 76 for transmitting signals from a high voltage side to a low voltage side of the plural lithium ion batteries 51 to 54, OR circuits 81, 82, 85, 87, and an inverter 86. In this embodiment, the signal receiver circuits 71, 75 have substantially the same configuration as that of the above-described configuration of the signal receiver circuit 22. In this embodiment, the signal transmitter circuits 72, 76 have substantially the same configuration as that of the above-described configuration of the signal transmitter circuit 11. In this embodiment, the signal receiver circuit 73 has substantially the same configuration as that of the above-described configuration of the signal transmitter circuit 32. In this embodiment, the signal transmitter circuit 74 has substantially the same configuration as that of the above-described configuration of the signal transmitter circuit 41.

For example, an overcharge detection signal is supplied from the protection circuit 62 to a terminal CI01A of the protection circuit 63 and received at the signal receiver circuit 71. The overcharge detection signal received at the signal receiver circuit 71 is supplied to the signal transmitter circuit 72 via an OR circuit 81. It is to be noted that an overcharge detection signal detected in the protection circuit 63 is also supplied to the OR circuit 81, to thereby obtain a logical sum between the overcharge detection signal received at the signal receiver circuit 71 and the overcharge detection signal detected in the protection circuit 63. Further, a disconnection detection signal output from the signal receiver circuit 71 is supplied to an OR circuit 82. The signal transmitter circuit 72 transmits the overcharge detection signal from a terminal CO12A of the protection circuit 63 to a terminal CI12A of the protection circuit 64 via a signal wiring 83.

Further, an over-current detection signal is supplied from the protection circuit 64 to a terminal CI21 of the protection circuit 63 via a signal wiring 84 and received at the signal receiver circuit 73. The over-current detection signal received at the signal receiver circuit 73 is supplied to the signal transmitter circuit 74 via an OR circuit 85. It is to be noted that an over-current detection signal detected in an over-current detection circuit (not illustrated) inside the protection circuit 63 is also supplied to the OR circuit 85, to thereby obtain a logical sum between the over-current detection signal received at the signal receiver circuit 73 and the over-current detection signal detected in the protection circuit 63. Further, a disconnection detection signal output from the signal receiver circuit 73 is inverted by an inverter 86 and supplied to an OR circuit 82. The signal transmitter circuit 74 transmits the over-current detection signal from a terminal CO10 of the protection circuit 63 to the protection circuit 62.

In another example, a disconnection detection signal is supplied from the protection circuit 62 to a terminal CI01B of the protection circuit 63 and received at the signal receiver circuit 75. The disconnection detection signal received at the signal receiver circuit 75 is supplied to the signal transmitter circuit 76 via an OR circuit 87. Further, a disconnection detection signal output from the signal receiver circuit 75 is supplied to an OR circuit 82. It is to be noted that a disconnection detection signal detected inside the protection circuit 63 is also supplied from the OR circuit 82 to the OR circuit 87, to thereby obtain a logical sum between the disconnection detection signal received at the signal receiver circuit 75 and the disconnection detection signal detected in the protection circuit 63. The signal transmitter circuit 76 transmits the disconnection detection signal from a terminal CO12B of the protection circuit 63 to a terminal CI12B of the protection circuit 64 via a signal wiring 88.

The protection circuit 64 includes a signal receiver circuit (RHL) 91 for receiving signals from a high voltage side to a low voltage side, a signal transmitter circuit (THL) 92 for transmitting signals from a high voltage side to a low voltage side of the plural lithium ion batteries 51 to 54, a signal receiver circuit (RLH) 93 for receiving signals from a low voltage side to a high voltage side of the plural lithium ion batteries 51 to 54, a signal transmitter circuit (TLH) 94 for transmitting signals from a low voltage side to a high voltage side of the plural lithium ion batteries 51 to 54, a signal receiver circuit (RHL) 95 for receiving signals from a high voltage side to a low voltage side of the plural lithium ion batteries 51 to 54, a signal transmitter circuit (THL) 96 for transmitting signals from a high voltage side to a low voltage side of the plural lithium ion batteries 51 to 54, OR circuits 101, 102, 105, 107, and an inverter 106. In this embodiment, the signal receiver circuits 91, 95 have substantially the same configuration as that of the above-described configuration of the signal receiver circuit 22. In this embodiment, the signal transmitter circuits 92, 96 have substantially the same configuration as that of the above-described configuration of the signal transmitter circuit 11. In this embodiment, the signal receiver circuit 93 has substantially the same configuration as that of the above-described configuration of the signal transmitter circuit 32. In this embodiment, the signal transmitter circuit 94 has substantially the same configuration as that of the above-described configuration of the signal transmitter circuit 41. The operations performed inside the protection circuit 64 are substantially the same as those of the protection circuit 63 and are not further described.

The signal transmitter circuit 96 of the protection circuit 64 outputs a logical sum (value 1 when disconnection is detected) of the disconnection detection signals from each of the protection circuits 61-64 as a control signal from a terminal CO23B. The control signal is inverted by an inverter 111 connected to the outside of the terminal CO23B and supplied to AND circuits 112, 113. A signal having a value 1 is supplied to the AND circuit 112 when discharging of the lithium ion batteries 51-54 is turned on (discharge ON). A signal having a value of 1 is supplied to the AND circuit 113 when charging of the lithium ion batteries 51-54 is turned on (charge ON). In a case where the AND circuits 112, 113 receive signals having a value of 0 from the inverter 111, the AND circuits 112, 113 supply signals having a value of 0 to the gates of the MOS transistors M1, M2. Thereby, both of the MOS transistors M1, M2 are turned off. Accordingly, current is prevented from flowing to the load (not illustrated) connected to the transmitter/receiver circuit 300.

Hence, with the above-described embodiments of the present invention, disconnection of a signal wiring can be detected. Accordingly, in a case of a signal transmitter circuit and a signal receiver circuit that transmits/receives signals indicating the detection of, for overcharge, there is no need to consider implementing a fail-safe configuration in view of the affect of disconnection. As a result, the degree of freedom of a logical configuration of the signal transmitter circuit and the signal receiver circuit can be increased.

Further, the present invention is not limited to these embodiments, but variations and modifications may be made without departing from the scope of the present invention.

The present application is based on Japanese Priority Application No. 2010-207212 filed on Sep. 15, 2010, with the Japanese Patent Office, the entire contents of which are hereby incorporated by reference.

What is claimed is:

1. A transmitter/receiver circuit, comprising:
 a first protection circuit including a transmitter circuit configured to increase a voltage of a high binary signal to a level that is a first voltage higher than an anode voltage of a first secondary battery connected to the first protection circuit; and
 a second protection circuit including a receiver circuit configured to receive the high binary signal transmitted from the transmitter circuit via a wiring, the receiver circuit including
 a shift part configured to decrease the voltage of the high binary signal to a level that is a second voltage lower than a cathode voltage of a second secondary battery connected to the second protection circuit, and
 a detection part configured to determine that the wiring is disconnected when the voltage of the high binary signal is lower than a first reference voltage.

2. The transmitter/receiver circuit as claimed in claim 1, wherein the first and second protection circuits are connected by cascade connection.

3. The transmitter/receiver circuit as claimed in claim 1, wherein the anode voltage of the first secondary battery is substantially equal to the cathode voltage of the second secondary battery.

4. The transmitter/receiver circuit as claimed in claim 1, wherein the receiver circuit further includes a comparator part configured to compare the voltage of the high binary signal with a second reference voltage.

5. A transmitter/receiver circuit, comprising:
 a first protection circuit including a transmitter circuit configured to decrease a voltage of a low binary signal to a level that is a first voltage lower than a cathode voltage of a first secondary battery connected to the first protection circuit; and
 a second protection circuit including a receiver circuit configured to receive the low binary signal transmitted from the transmitter circuit via a wiring, the receiver circuit including
 a shift part configured to increase the voltage of the low binary signal to a level that is a second voltage higher than an anode voltage of a second secondary battery connected to the second protection circuit, and
 a detection part configured to determine that the wiring is disconnected when the voltage of the low binary signal is higher than a first reference voltage.

6. The transmitter/receiver circuit as claimed in claim 5, wherein the first and second protection circuits are connected by cascade connection.

7. The transmitter/receiver circuit as claimed in claim 5, wherein the cathode voltage of the first secondary battery is substantially equal to the anode voltage of the second secondary battery.

8. The transmitter/receiver circuit as claimed in claim 5, wherein the receiver circuit further includes a comparator part configured to compare the voltage of the low binary signal with a second reference voltage.

9. The transmitter/receiver circuit as claimed in claim 1, further comprising:
 another transmitter/receiver circuit having another first protection circuit including another transmitter circuit configured to decrease another voltage of another low binary signal to a level that is another first voltage lower than another cathode voltage of another first secondary battery connected to another first protection circuit; and
 another second protection circuit including another receiver circuit configured to receive the another low binary signal transmitted from the another transmitter circuit via another wiring, the another receiver circuit including
 another shift part configured to increase the another voltage of the another low binary voltage to a level that is another second voltage higher than another anode voltage of another second secondary batter connected to the another second protection circuit, and
 another detection part configured to determine that the another wiring is disconnected when the another voltage of the another low binary signal is higher than another reference voltage.

* * * * *